United States Patent
Rasmusson

(10) Patent No.: US 9,621,805 B2
(45) Date of Patent: Apr. 11, 2017

(54) METHOD, SYSTEM AND COMPUTER PROGRAM PRODUCT FOR DEBLURING IMAGES

(71) Applicant: Sony Corporation, Tokyo (JP)

(72) Inventor: Jim Rasmusson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/786,445

(22) PCT Filed: Mar. 12, 2014

(86) PCT No.: PCT/IB2014/059654
§ 371 (c)(1),
(2) Date: Oct. 22, 2015

(87) PCT Pub. No.: WO2015/136327
PCT Pub. Date: Sep. 17, 2015

(65) Prior Publication Data
US 2016/0112639 A1   Apr. 21, 2016

(51) Int. Cl.
*H04N 5/222* (2006.01)
*G06K 9/40* (2006.01)
(Continued)

(52) U.S. Cl.
CPC .......... *H04N 5/23248* (2013.01); *G06T 5/003* (2013.01); *G06T 7/0081* (2013.01); *G06T 7/2006* (2013.01); *H04N 5/3532* (2013.01)

(58) Field of Classification Search
CPC ........... H04N 5/23254; H04N 5/23258; H04N 5/23267; H04N 5/2258; H04N 5/2329;
(Continued)

(56) References Cited

U.S. PATENT DOCUMENTS 8,396,321 B1 * 3/2013 Aldrich .............. H04N 5/23254
348/208.1
2007/0258707 A1 * 11/2007 Raskar ................... G03B 17/00
396/52

(Continued)

FOREIGN PATENT DOCUMENTS

WO       2008131438 A2   10/2008

OTHER PUBLICATIONS

"Rolling Shutter", Wikipedia, Retrieved on Jan. 20, 2016, URL: http://en.wikipedia.org/wiki/Rolling_shutter.
(Continued)

*Primary Examiner* — Trung Diep
(74) *Attorney, Agent, or Firm* — James C. Edwards; Moore & Van Allen, PLLC

(57) ABSTRACT

The invention is directed to a camera deblur technique. An exemplary method comprises capturing an image using the camera, wherein the image is captured using a first sampling frequency; estimating, using pixel samples from the image and sampled with a second sampling frequency, a blur function, wherein the second sampling frequency is greater than the first sampling frequency; and performing deblur processing of the image based on the estimated blur function.

15 Claims, 2 Drawing Sheets

(51) Int. Cl.
*G03B 17/00* (2006.01)
*H04N 5/232* (2006.01)
*G06T 5/00* (2006.01)
*G06T 7/00* (2017.01)
*G06T 7/20* (2017.01)
*H04N 5/353* (2011.01)

(58) Field of Classification Search
CPC .......... H04N 21/2187; H04N 21/4223; H04N 5/144; H04N 5/145; H04N 5/23251; H04N 5/23274; H04N 5/23277; H04N 5/23264; H04N 5/2328
USPC ..... 348/208.1, 208.2, 208.6, 208.99, 207.99; 382/255; 396/52
See application file for complete search history.

(56) References Cited

U.S. PATENT DOCUMENTS

| | | | | |
|---|---|---|---|---|
| 2009/0002501 | A1* | 1/2009 | Silsby | G11B 31/006 348/208.16 |
| 2010/0053346 | A1 | 3/2010 | Mitsunaga | |
| 2010/0246989 | A1* | 9/2010 | Agrawal | G06T 5/003 382/255 |
| 2012/0062787 | A1* | 3/2012 | Muijs | G06T 5/003 348/345 |

OTHER PUBLICATIONS

Tirosh, Udi, "Everything You Wanted to Know About Rolling Shutter", DIY Photography, Sep. 24, 2012, URL: http://diyphotography.net/everything-you-wanted-to-know-about-rolling-shutter.

Ben-Ezra, Moshe et al., "Motion-Based Motion Deblurring", IEEE Transactions on Pattern Analysis and Machine Intelligence, Jun. 2004, vol. 26, No. 6, pp. 689-698.

Reeves, Stan, "Image deblurring—Introduction >> Steve on Image Processing", Mathworks, Aug. 13, 2007, URL: http://blogs.mathworks.com/steve/2007/08/13/image-deblurring-introduction/.

Kundur, Deepa et al., "Blind Image Deconvolution", IEEE Signal Processing Magazine, May 1996, pp. 43-64.

Ben-Ezra M et al: "Motion deblurring using hybrid imaging", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif., vol. 1, Jun. 18, 2003, pp. 657-664, XP010644960.

International Search Report and Written Opinion; Aug. 21, 2014, issued in International Patent Application No. PCT/IB2014/059654.

* cited by examiner

110

METHOD, SYSTEM AND COMPUTER PROGRAM PRODUCT FOR DEBLURING IMAGES

BACKGROUND ART

A captured image is blurred when a user of a camera does not remain still when capturing the image. There is a need to remove the blurriness from a captured image after capturing the image.

SUMMARY

Embodiments of the invention are directed to a system, method, and computer program product for deblur processing in a camera. An exemplary method comprises: capturing an image using the camera, wherein the image is captured using a first sampling frequency; estimating, using pixel samples from the image and sampled with a second sampling frequency, a blur function, wherein the second sampling frequency is greater than the first sampling frequency; and performing deblur processing of the image based on the estimated blur function.

In some embodiments, the estimated blur function comprises an estimated point spread function (PSF).

In some embodiments, the deblur processing is based on a deconvolution technique.

In some embodiments, the camera comprises a sensor, and estimating the blur function comprising scanning the sensor line-by-line.

In some embodiments, the scan-line comprises a horizontal scan-line.

In some embodiments, the scan-line comprises a vertical scan-line.

In some embodiments, the camera comprises an electronic rolling shutter.

In some embodiments, the image comprises a blurred image.

In some embodiments, the estimated blur function is constant throughout the image.

In some embodiments, the blur function comprises a two-dimensional function.

In some embodiments, the image is divided into a first segment and a second segment, and wherein the estimated blur function associated with the first segment is different from the estimated blur function associated with the second segment.

In some embodiments, the image is divided into segments, and wherein a number of the segments are based on a number of scan-lines associated with a sensor of the camera.

In some embodiments, the method further comprises capturing a second image using a second camera, wherein the second image is captured using a third sampling frequency, wherein the first image is captured substantially simultaneously with the capturing of the second image; estimating, using pixel samples from the second image and sampled with a fourth sampling frequency, a second blur function, wherein the fourth sampling frequency is greater than the third sampling frequency; and performing deblur processing of the second image based on the estimated second blur function.

In some embodiments, a system is provided for deblur processing. The system comprises: a first camera; a memory; a processor; a module, stored in the memory, executable by the processor, and configured to: capture an image using the camera, wherein the image is captured using a first sampling frequency; estimate, using pixel samples from the image and sampled with a second sampling frequency, a blur function, wherein the second sampling frequency is greater than the first sampling frequency; and perform deblur processing of the image based on the estimated blur function.

In some embodiments, the system further comprises a second camera, wherein the second camera is positioned approximately perpendicularly to the first camera; and the module is further configured to: capture a second image using the second camera, wherein the second image is captured using a third sampling frequency, wherein the first image is captured substantially simultaneously with the capturing of the second image; estimate, using pixel samples from the second image and sampled with a fourth sampling frequency, a second blur function, wherein the fourth sampling frequency is greater than the third sampling frequency; and perform deblur processing of the second image based on the estimated second blur function.

In some embodiments, a computer program product is provided for deblur processing in a camera. The computer program product comprises a non-transitory computer-readable medium comprising code configured to: capture an image using the camera, wherein the image is captured using a first sampling frequency; estimate, using pixel samples from the image and sampled with a second sampling frequency, a blur function, wherein the second sampling frequency is greater than the first sampling frequency; and perform deblur processing of the image based on the estimated blur function.

BRIEF DESCRIPTION OF DRAWINGS

Figure 1:
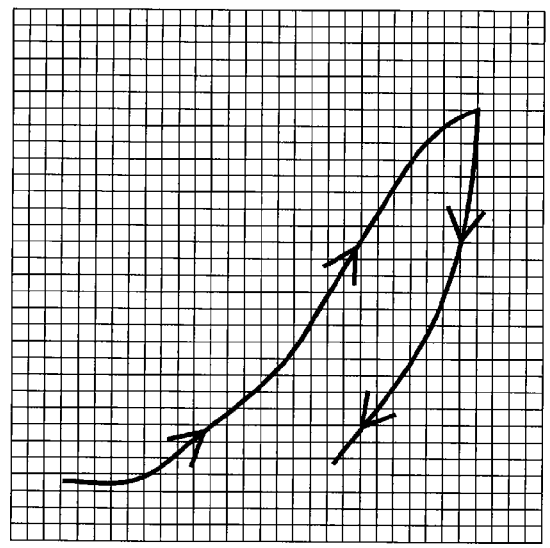
Figure 2:
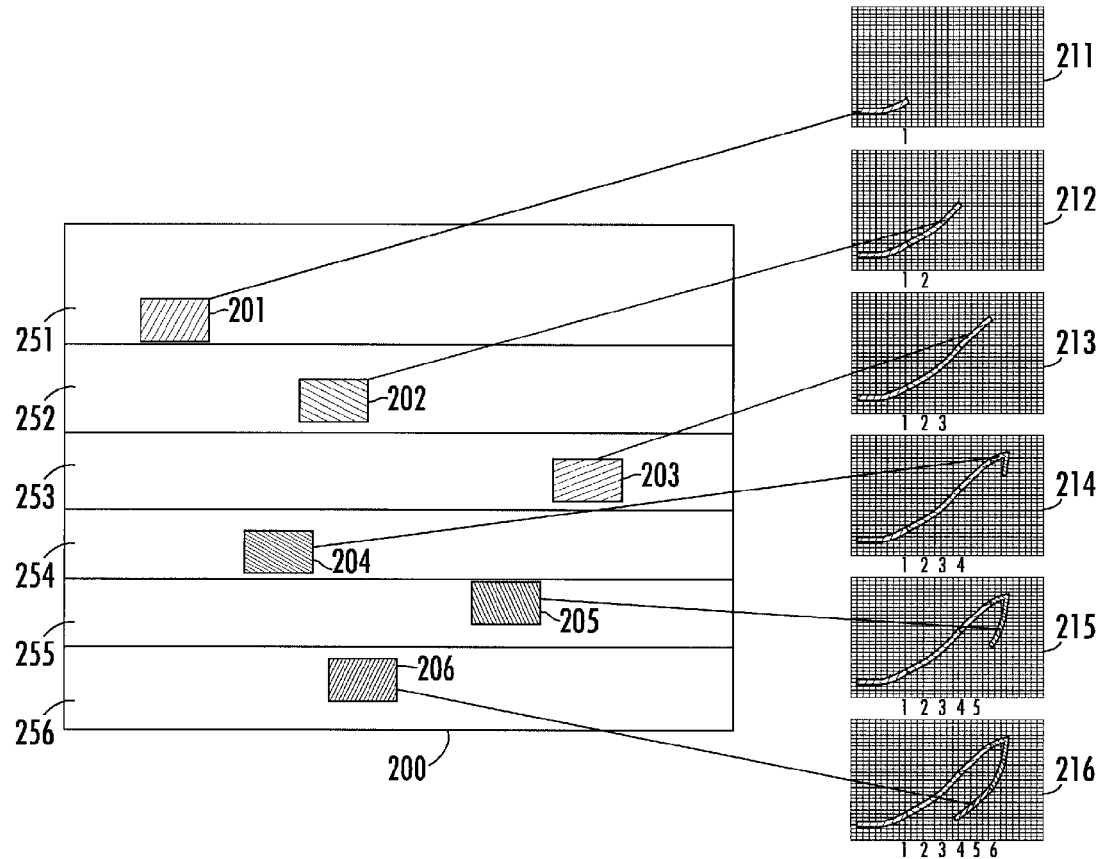
Figure 3:
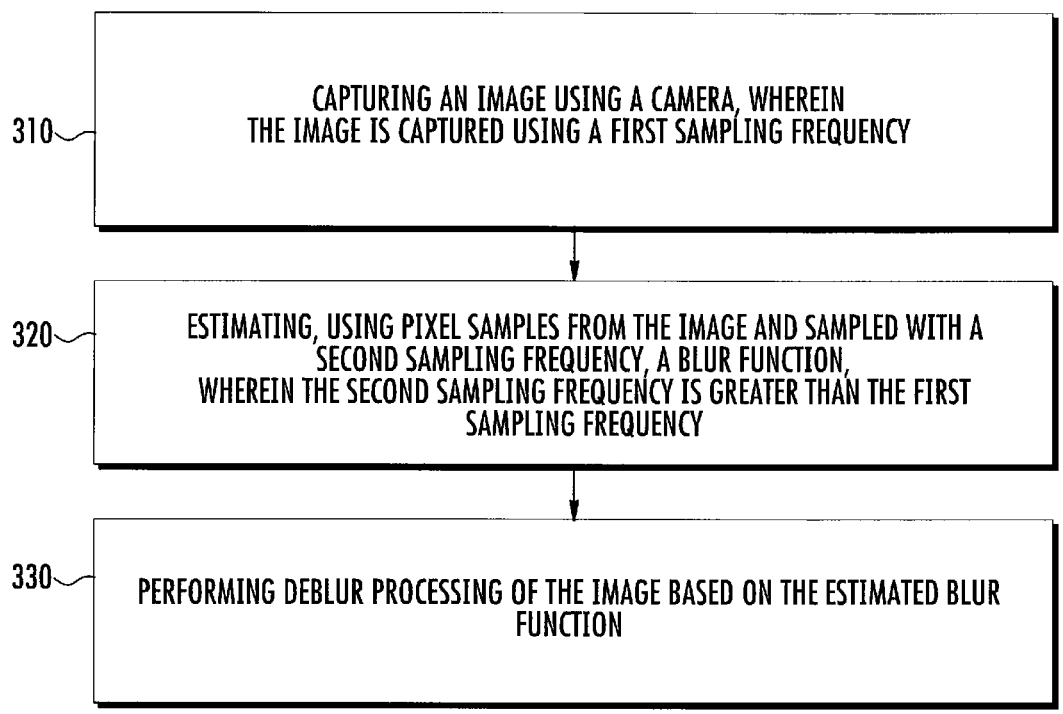

Having thus described embodiments of the invention in general terms, reference will now be made to the accompanying drawings, where:

FIG. 1 illustrates an exemplary blur function, in accordance with embodiments of the present invention;

FIG. 2 illustrates a block diagram for constructing the blur function, in accordance with embodiments of the present invention; and FIG. 3 illustrates a process flow for a deblur method to be performed by a camera, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Removing shake blur from an image (referred to herein as "deblurring") after exposure of the image is a difficult problem. Often it involves estimating a blur function that contains information of how a user moved or shook the camera during exposure. Once this function is estimated, the blurriness of the image can be removed or corrected based on this function. One such function is the "point spread function" (PSF). The blur function described herein is not limited to a PSF.

The present invention assumes both a shift-invariant model for a captured image, meaning that every point in the image spreads out the same way in forming the blurry image and in an alternative embodiment a non-shift-invariant model, where different parts of the image are blurred differently. The image may be divided into segments and each segment is blurred differently. The segmentation of the image is further described with respect to FIG. 2. This image is modeled with convolution: g(m,n)=h(m,n)*f(m,n)+u(m, n), where * is 2-D convolution, h(m,n) is the point-spread function (PSF), f(m,n) is the original image, and u(m,n) is noise (usually considered independent identically distributed Gaussian noise). Convolution is a mathematical operation on two functions f and h, producing a third function that is typically viewed as a modified version of one of the original functions. Deconvolution is an operation for reversing convolution.

Estimating the blur function from a single image "post capture" does not produce an accurate estimation of the blur function. Essentially, such an estimation method works for small blur patterns and low frequency blur patterns. However, such an estimation method does not work well for larger blur patterns and high frequency blur patterns. As used herein, exposure refers to controlling the amount of light that reaches various parts of a photographic sensor in a camera. The present invention is directed to sampling at least parts of an image with higher frequency (e.g., a frequency that is higher than the image acquisition or image capture frequency) during exposure. Executing this sampling method enables estimation of the blur function with higher accuracy. As described herein, the method exploits sensor scan-lines during image acquisition. As used herein, image acquisition refers to image capture, or vice versa.

In order to sample the blur function with a higher frequency than the image acquisition frequency, a first camera is used for image acquisition (or image capture), and a second, higher speed or higher frequency, camera is used to sample the blur function. As described herein, sampling the blur function refers to estimating the blur function using pixel samples associated with a captured image. Sampling the blur function is important for deconvolving a captured image in order to reduce the image blur. However, using a second camera can require the expenditure of financial resources, and consumes energy and space. Some embodiments of the present invention are directed to sampling the blur function and thereby reducing the image blur without using a second camera.

The present invention is directed to exploiting the scan-lines of the sensor. A camera's sensor (e.g., a mobile device or mobile phone camera sensor) does not have a mechanical shutter. Instead, the camera uses an electronic rolling shutter when performing exposure of the image from the sensor. The camera samples or scans the sensor "line by line" and thereby performs exposure of the image "line by line." For exemplary purposes, the scan-line as described herein is a horizontal line in a captured image. In alternate embodiments, the scan-line may be a vertical line in a captured image.

For example, a nine (9) megapixel (3920×2204) camera enables capture of images in a 16:9 ratio. The width of a pixel is 3920 units, and the height of a pixel is 2204 units, which means that the image is sampled with 2204 horizontal lines per image. In some embodiments, the blur function is constant throughout the captured image, so blur function samples (or pixel samples) can be obtained from various parts of the image. Even in embodiments where the blur function is not constant throughout the captured image, pixel samples can be obtained from various parts of the image.

In alternate embodiments of the invention, two cameras (e.g., a first camera and a second camera) are provided. The two cameras may be housed in the same device or are housed in different devices. The second camera may be turned approximately ninety (90) degrees (e.g., substantially perpendicularly) in relation to the first camera. The scan-lines of the sensor in the second camera are scanned in a substantially perpendicular fashion to the scan-lines of the sensor in the first camera (e.g., if the first camera scans the first camera's sensor's scan-lines horizontally, the second camera scans the second camera's sensor's scan-lines vertically). In these embodiments, the first camera and the second camera need to be synchronized so that they acquire or capture the image substantially simultaneously, i.e., at substantially the same time. The estimated blur function associated with the first camera may be used to perform deblur processing of the image captured by the first camera. The estimated blur function associated with the second camera may be used to perform deblur processing of the image captured by the second camera. The image captured by the first camera and the image captured by the second camera may be combined to produce a single output image. The second camera helps in increasing the precision of the blur function associated with the first camera by adding a perpendicular sampling scheme.

Referring now to FIG. 1, FIG. 1 illustrates an exemplary blur function 110. The blur function may be a PSF. Every point in an image captured by a camera spreads out in a way defined by the estimated blur function. Referring now to FIG. 2, FIG. 2 illustrates how to generate the estimated blur function presented in FIG. 1. FIG. 2 presents a captured image 200. The blur function is sampled at various parts 201, 202, 203, 204, 205, and 206 of the image 200. The blur function samples 201, 202, 203, 204, 205, and 206 are combined to form the estimated blur function 216. The blur function samples 201, 202, 203, 204, 205, and 206 may also be referred to as pixel samples. While FIG. 2 indicates six samples are combined to form the estimated blur function 216, in other embodiments, more or less than six samples may be combined to form the estimated blur function 216. For example, if the only samples collected are from parts 201 and 202 of the image 200, the estimated blur function 211 is generated, and if the only samples collected are from parts 201, 202, and 203 of the image 200, the estimated blur function 212 is generated.

As indicated in FIG. 2, the image may be divided or segmented into several segments 251, 252, 253, 254, 255, and 256. As indicated in FIG. 2, the segments are horizontal segments, but in alternate embodiments, the segments may be vertical segments. In some embodiments, each segment has the same blurring as another one of the segments. In other embodiments, each segment has a different blurring compared to another one of the segments. In some embodiments, the portion of the image in each segment has constant blurring. In other embodiments, the portion of the image in each segment may be blurred differently. In embodiments where the segments are horizontal segments, each segment may comprise a single horizontal line (also referred to as a scan-line) or multiple horizontal lines. Therefore, the height of the segment may vary from one segment to another. In alternate embodiments, the heights of one or more segments are substantially equal. The type of blurring that occurs in each segment depends on the exposure setting of the camera and also how the camera is moved when capturing the image.

Referring now to the process flow of FIG. 3, FIG. 3 illustrates a process flow for deblur processing in a camera. In some embodiments, the camera, comprising an electronic rolling shutter, is part of a mobile device (e.g., a mobile phone). At block 310, the process flow comprises capturing an image using the camera, wherein the image (e.g., a blurred image) is captured using a first sampling frequency. At block 320, the process flow comprises estimating, using pixel samples from the image and sampled with a second sampling frequency, a blur function, wherein the second sampling frequency is greater than the first sampling frequency. Pixel samples associated with a captured image refer to portions or segments (e.g., segments of FIG. 2) of the captured image. At block 330, the process flow comprises performing deblur processing of the image based on the sampled blur function. The deblur processing can be based on a deconvolution technique. The camera comprises a sensor, and sampling the blur function comprising scanning the sensor line-by-line. The scanned line comprises a horizontal or vertical scan-line.

As described herein, in some embodiments, the blur function is not sampled directly. Instead, the blur function is estimated using pixel samples associated with the captured image. Blind deconvolution techniques may be used for estimating the blur function. Blind deconvolution refers to estimating the blur function using partial information about the image (e.g., using information associated with a sample of, but not all, pixels of the image).

In some embodiments, the method further comprises capturing a second image using a second camera, wherein the second image is captured using a third sampling frequency. The first image is captured substantially simultaneously with the capturing of the second image. The method further comprises estimating, using pixel samples from the second image and sampled with a fourth sampling frequency, a second blur function. The fourth sampling frequency is greater than the third sampling frequency. The sampling axis of the second image is substantially perpendicular to the sampling axis of the first image (e.g., wherein the scan-lines of the sensor of the second camera are substantially perpendicular to the scan-lines of the sensor of the first camera). The method further comprises performing deblur processing of the second image based on the second estimated blur function.

The invention is not limited to any particular types of devices containing cameras. Examples of such devices include portable or non-portable media devices, mobile phones or other mobile computing devices, mobile televisions, laptop computers, smart screens, tablet computers or tablets, portable desktop computers, e-readers, eyewear, scanners, standalone cameras, portable media devices, gaming devices, or other image-capturing devices, watches, bands (e.g., wristbands) or other wearable devices, or other portable or non-portable computing or non-computing devices.

Each device or system described herein is a computing device that comprises a camera, a processor, a memory, and a module stored in the memory, executable by the processor, and configured to perform the various processes described herein. Each processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for deblur processing in a camera, the method comprising:
    capturing an image using the camera, wherein the image is captured using a first sampling frequency;
    estimating, using pixel samples from the image and sampled with a second sampling frequency, a blur function, wherein the second sampling frequency is greater than the first sampling frequency; and
    performing deblur processing of the image based on the estimated blur function.

2. The method of claim 1, wherein the estimated blur function comprises an estimated point spread function (PSF).

3. The method of claim 1, wherein the deblur processing is based on a deconvolution technique.

4. The method of claim 1, wherein the camera comprises a sensor, and wherein estimating the blur function comprising scanning the sensor line-by-line.

5. The method of claim 4, wherein the scan-line comprises a horizontal scan-line.

6. The method of claim 4, wherein the scan-line comprises a vertical scan-line.

7. The method of claim 1, wherein the camera comprises an electronic rolling shutter.

8. The method of claim 1, wherein the blur function comprises a two-dimensional function.

9. The method of claim 1, wherein the estimated blur function is constant throughout the image.

10. The method of claim 1, wherein the image is divided into a first segment and a second segment, and wherein the estimated blur function associated with the first segment is different from the estimated blur function associated with the second segment.

11. The method of claim 1, wherein the image is divided into segments, and wherein a number of the segments are based on a number of scan-lines associated with a sensor of the camera.

12. The method of claim 1, further comprising:
    capturing a second image using a second camera, wherein the second image is captured using a third sampling frequency, wherein the first image is captured substantially simultaneously with the capturing of the second image;
    estimating, using pixel samples from the second image sampled with a fourth sampling frequency, a second blur function, wherein the fourth sampling frequency is greater than the third sampling frequency; and
    performing deblur processing of the second image based on the estimated second blur function.

13. A system for deblur processing, the system comprising:
- a first camera;
- a memory;
- a processor;
- a module, stored in the memory, executable by the processor, and configured to:
  - capture an image using the camera, wherein the image is captured using a first sampling frequency;
  - estimate, using pixel samples from the image and sampled with a second sampling frequency, a blur function, wherein the second sampling frequency is greater than the first sampling frequency; and
  - perform deblur processing of the image based on the estimated blur function.

14. The system of claim 1, further comprising:
a second camera, wherein the second camera is positioned approximately perpendicularly to the first camera; and wherein the module is further configured to:
- capture a second image using the second camera, wherein the second image is captured using a third sampling frequency, wherein the first image is captured substantially simultaneously with the capturing of the second image;
- estimate, using pixel samples from the second image and sampled with a fourth sampling frequency, a second blur function, wherein the fourth sampling frequency is greater than the third sampling frequency; and
- perform deblur processing of the second image based on the estimated second blur function.

15. A computer program product for deblur processing in a camera, the computer program product comprising a non-transitory computer-readable medium comprising code configured to:
- capture an image using the camera, wherein the image is captured using a first sampling frequency;
- estimate, using pixel samples from the image and sampled with a second sampling frequency, a blur function, wherein the second sampling frequency is greater than the first sampling frequency; and
- perform deblur processing of the image based on the estimated blur function.

* * * * *